(12) United States Patent
Hirsch

(10) Patent No.: US 9,513,724 B2
(45) Date of Patent: Dec. 6, 2016

(54) DEVICE AND METHOD FOR ADJUSTING OBJECT ILLUMINATION

(75) Inventor: Alexander Samson Hirsch, Rolling Meadows, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 904 days.

(21) Appl. No.: 13/221,015

(22) Filed: Aug. 30, 2011

(65) Prior Publication Data
US 2013/0050233 A1 Feb. 28, 2013

(51) Int. Cl.
*G06F 3/038* (2013.01)
*G09G 5/02* (2006.01)
*G09G 5/00* (2006.01)
*H04N 1/00* (2006.01)

(52) U.S. Cl.
CPC ............... *G06F 3/038* (2013.01); *G09G 5/00* (2013.01); *G09G 5/02* (2013.01); *H04N 1/00127* (2013.01); *G09G 2320/0626* (2013.01); *G09G 2360/144* (2013.01)

(58) Field of Classification Search
USPC ...................................................... 362/3–18
See application file for complete search history.

(56) References Cited

U.S. PATENT DOCUMENTS

| | | | | |
|---|---|---|---|---|
| 5,815,225 A * | 9/1998 | Nelson | ............... | G06F 1/1637 349/1 |
| 6,823,198 B2 * | 11/2004 | Kobayashi | ........... | H04N 5/2256 348/224.1 |
| 7,663,691 B2 * | 2/2010 | Ciudad et al. | ................. | 348/371 |
| 7,965,859 B2 * | 6/2011 | Marks | ................... | H04N 5/2226 345/84 |
| 2002/0018129 A1 * | 2/2002 | Ikeda | ..................... | H04N 9/735 348/223.1 |
| 2004/0239799 A1 * | 12/2004 | Suzuki | ................. | H04N 5/2256 348/370 |
| 2005/0207644 A1 * | 9/2005 | Kitagawara | ............. | G06T 11/60 382/167 |
| 2007/0002130 A1 | 1/2007 | Hartkop | | |
| 2007/0121343 A1 * | 5/2007 | Brown | ................ | F21V 33/0052 362/612 |
| 2007/0279427 A1 | 12/2007 | Marks | | |
| 2008/0006762 A1 * | 1/2008 | Fadell | .................... | G01J 1/4204 250/201.1 |
| 2009/0129115 A1 * | 5/2009 | Fine | ...................... | G02B 6/0021 362/606 |
| 2010/0092090 A1 * | 4/2010 | Hibi | ........................ | G06T 7/606 382/190 |
| 2010/0182294 A1 * | 7/2010 | Roshan | ..................... | G01J 1/32 345/207 |
| 2010/0189429 A1 * | 7/2010 | Butterworth | ............. | G03B 7/08 396/155 |
| 2013/0015946 A1 * | 1/2013 | Lau | ........................... | G07C 9/00 340/5.2 |
| 2013/0033467 A1 * | 2/2013 | Kohtoku | ........... | G02F 1/133603 345/204 |
| 2013/0050233 A1 * | 2/2013 | Hirsch | .................... | G06F 3/038 345/589 |
| 2013/0050395 A1 * | 2/2013 | Paoletti | ................... | H04N 7/142 348/14.02 |
| 2014/0055978 A1 * | 2/2014 | Gantz | .................... | A45C 11/00 362/8 |
| 2015/0002735 A1 * | 1/2015 | Moskovchenko | ... | H04N 5/2354 348/370 |
| 2015/0358520 A1 * | 12/2015 | Thimmappa | ......... | H04N 5/2256 348/217.1 |

FOREIGN PATENT DOCUMENTS

EP    2249136 A2    11/2010

OTHER PUBLICATIONS

Extended European Search report mailed Jan. 30, 2012; in corresponding application No. 11179289.1.

(Continued)

*Primary Examiner* — Kent Chang
*Assistant Examiner* — Nathan Brittingham
(74) *Attorney, Agent, or Firm* — Fish & Richardson P.C.

(57) ABSTRACT

A method for adjusting object illumination with a mobile device having a display device is described. The method includes detecting illumination of an object and generating illumination data information; and adjusting a luminance of the display device in dependence on the object illumination data to adjust image lighting.

21 Claims, 6 Drawing Sheets

(56) References Cited

OTHER PUBLICATIONS

HICTECH, Dynamic Mirror HD-light up your face, Apple iTunes, http://itunes.apple.com/us/app/dynamic-mirror-hd-light-up/id378059645<as appeared on Feb. 23, 2011.

W.S.-513, Front Camera Flash, AppleiTunes, http//itunes.apple.com/app/front-camera-flash/id385437623< as appeared on Feb. 23, 2011.

Office Action mailed Mar. 3, 2014; in corresponding Canadian patent application No. 2,783,440.

* cited by examiner

DEVICE AND METHOD FOR ADJUSTING OBJECT ILLUMINATION

FIELD OF TECHNOLOGY

The present disclosure relates to electronic devices, including mobile devices having image capture devices.

BACKGROUND

Mobile electronic devices, including mobile phones, handheld gaming devices, and tablet and notebook computers, have gained widespread use and may provide a variety of functions including, for example, telephony, electronic text messaging, e-mail, web browsing, and audio and video playback, among other things. Many of these devices include imaging capabilities allowing for applications which capture video and still images.

With the portability of mobile devices, the environment in which the imaging capabilities of these devices are used varies widely. In many instances, the lighting environment is poor and results in poor image or video capture.

BRIEF DESCRIPTION OF THE DRAWINGS

Embodiments of the present disclosure will now be described, by way of example only, with reference to the attached figures, wherein.

DETAILED DESCRIPTION

Figure 1:
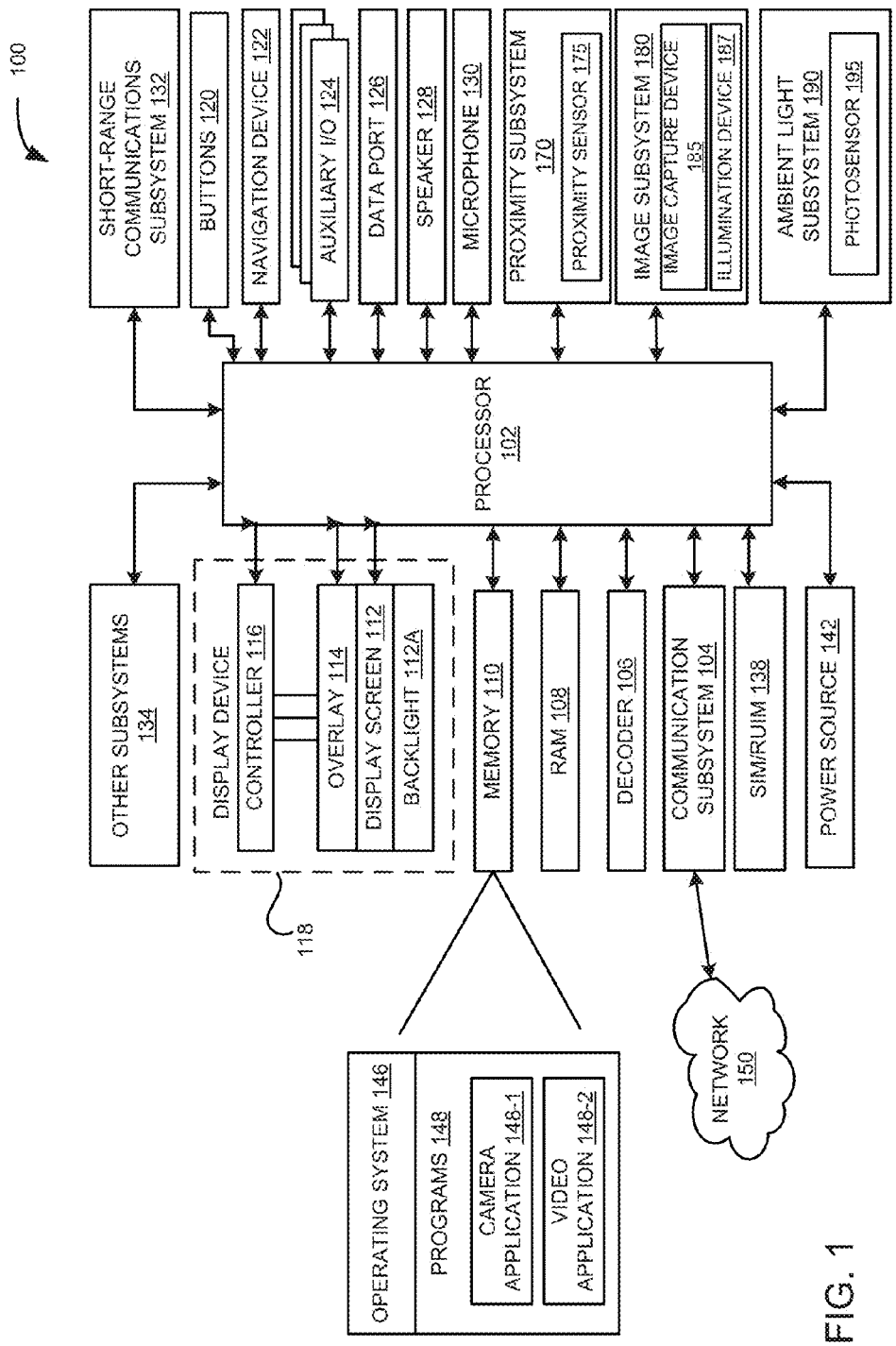
FIG. 1 is a simplified block diagram of components including internal components of a mobile device according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

According to one example of the present disclosure is a method for adjusting object illumination with a mobile device having a display device. The method includes detecting illumination of an object and generating illumination data, and adjusting a luminance of the display device, in response to the illumination data, to change the object illumination.

According to another example is a mobile device having a display device; a sensor for sensing illumination of an object and generating illumination data, and a processor configured to receive the object illumination data, and adjust a luminance of the display device, in response to the illumination data, to change the object illumination.

Reference is made to FIG. 1, which illustrates in block diagram form, an example mobile device 100 to which example embodiments described in the present disclosure can be applied. The mobile device 100 includes multiple components, such as a processor 102 that controls the overall operation of the mobile device 100. Communication functions, including data and voice communications, are performed through a communication subsystem 104. If data is received by the mobile device 100 in a compressed or encrypted format, the data may be decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the mobile device 100.

The processor 102 interacts with other components, such as Random Access Memory (RAM) 108, memory 110, a display screen 112 (such as a liquid crystal display (LCD)) with a touch-sensitive overlay 114 coupled to an electronic controller 116 that together comprise a touch-sensitive display device 118, one or more keys or buttons 120, a navigation device 122, one or more auxiliary input/output (I/O) subsystems 124, a data port 126, an image capture subsystem 180, a speaker 128, a microphone 130, short-range communications subsystem 132, an ambient light subsystem 190, and other device subsystems 134. It will be appreciated that the electronic controller 116 of the touch-sensitive display device 118 need not be physically integrated with the touch-sensitive overlay 114 and display screen 112. User-interaction with a graphical user interface (GUI) is performed through the touch-sensitive overlay 114. The GUI displays user interface screens on the touch-sensitive display device 118 for displaying information or providing a touch-sensitive onscreen user interface element for receiving input. This content of the user interface screen varies depending on the device state and active application, among other factors. Some user interface screens may include a text field sometimes called a text input field. The processor 102 interacts with the touch-sensitive overlay 114 via the electronic controller 116. Information, such as text, characters, symbols, images, icons, and other items that may be displayed or rendered on a mobile device, is displayed on the touch-sensitive display device 118 via the processor 102.

The display screen 112 may be an LCD, a light-emitting diode (LED) display, an organic light-emitting diode (OLED) display, or any other device or combination thereof suitable for a mobile device 100. In some example embodiments, the display screen 112 may include a backlight 112A, such as a LED backlight.

The auxiliary I/O subsystems 124 could include other input devices such as one or more control keys, a keyboard or keypad, navigational tool (input device), or both. The navigational tool may be a depressible (or clickable) joystick such as a depressible optical joystick, a depressible trackball, a depressible scroll wheel, or a depressible touch-sensitive trackpad or touchpad. The other input devices could be included in addition to, or instead of, the touch-sensitive display device 118, depending on the embodiment.

To identify a subscriber for network access, the mobile device 100 uses a Subscriber Identity Module or a Removable User Identity Module (SIM/RUIM) card 138 for communication with a network, such as the wireless network 150. Alternatively, user identification information may be programmed into memory 110.

The mobile device 100 includes an operating system 146 and software programs or components 148 that are executed by the processor 102 and are typically stored in a persistent, updatable store such as the memory 110. Additional applications or programs may be loaded onto the mobile device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the mobile device 100 is similar. The speaker 128 outputs audible information converted from electrical signals, and the microphone 130 converts audible information into electrical signals for processing.

In some example embodiments, the mobile device 100 includes an image capture subsystem 180. The image capture subsystem 180 includes an image capture device 185 adapted to capture photo or video image data. In some example embodiments, the image capture subsystem 180 may include one or more modules or sub-processors for processing image data received through the image capture device 185.

In an example embodiment, the operation and functionality of the image capture subsystem 180 and its associated image capture device 185 is controlled by processor 102 operating under instructions from a camera application 148-1 or a video application 148-2 that is included among software programs 148. In example embodiments, the camera application 148-1 or video application 148-2 enables the handheld electronic device 100 to operate in an image or video capturing mode in which image data received through the image capture device 185 is displayed on display screen 118 and, upon occurrence of a capture trigger, an image or video file derived from the received image data is created and stored as an image or video file in persistent memory such as memory 110 or a memory card inserted into a memory card interface of the mobile device 100.

By way of example, the mobile device 100 may be configured to enter a camera mode when a predetermined user input is received such as user selection of a physical camera mode enabling button 120 or a predetermined soft button or icon is selected on display screen 118. Once in camera mode, real time-image data of an object as received through the image capture device 185 is continually displayed on the display screen 118 so that the user can preview or observe in real-time an image that represents the image data being received by image capture device 185. Upon occurrence of an image capture trigger, the image data received through the image capture device 185 at the time that the image capture trigger occurs is captured, processed and stored as an image file on the mobile device 100. The image data stored in the image file may be an encoded, compressed or otherwise processed version of the image data received by the image capture device 185. In various examples, the stored image file may be, among other things, a TIFF, JEPG, PNG or GIF file. The image data may also be stored in a raw image format to minimize processing and to preserve image fidelity. The image capture trigger may include a predetermined user input, for example, activation of navigation device 122, pressing of a predetermined button 120, or user selection of a predetermined soft button or icon on display screen 112. In some cases the image capture trigger could include a predetermined user input followed by a predetermined delay.

In an example embodiment, the operation and functionality of the image capture subsystem 180 and its associated image capture device 185 may also be controlled by processor 102 operating under instructions from a video application 148-2 that is included among software programs 148. In some example embodiments, the video application 148-2 may be a video camera application, a video chat application, a multimedia messaging service application, a video chat/phone application, or any other application that can handle video image data.

In some example embodiments, the camera 148-1 and video 148-2 applications may include a driver or module for controlling the image capture subsystem 180 to provide image or video capabilities. In some example embodiments, the driver or module may be called by another camera, video or other application that utilizes the image capture subsystem.

In example embodiments, the video application 148-2 enables the handheld electronic device 100 to operate in a video mode in which image data received through the image capture device 185 is displayed on display screen 118. For example, the mobile device 100 may be configured to enter a video mode when a when a predetermined user input is received such as user selection of a video mode enabling button 120 or a predetermined soft button or icon is selected on display screen 118. Once in video mode, real time-image data as received through the image capture device 185 may be continually displayed on the display screen 118 so that the user can preview or observe in real-time a video that represents the image data being received by image capture device 185.

Upon occurrence of a video capture trigger, the image data received through the image capture device 185 at the time that the video capture trigger occurs is recorded until occurrence of a stop capture trigger. The recorded image data is processed and stored as a video file on the mobile device 100. The image data stored in the video file may be an encoded, compressed or otherwise processed version of the image data received by the image capture device 185. In various examples, the stored video file may be, among other things, in an MPEG, AVI, WMV, H.264, OGV, or Quick-Time video format. In some examples, the stored video may also include audio data recorded using the microphone 130. The video capture and stop capture triggers may include a predetermined user input, for example, activation of navigation device 122, pressing of a predetermined button 120, or user selection of a predetermined soft button or icon on display screen 112. In some cases the video capture or stop capture trigger could include a predetermined user input followed by a predetermined delay.

In some example embodiments, the video application 148-2 enables the handheld electronic device 100 to operate in a video conferencing mode in which image data captured by the image capture device 185 is transmitted to a recipient via the communication subsystem 104, the short-range communications subsystem 132, or any other subsystem 134 capable of transmitting image data to a recipient.

In some example embodiments, the image capture subsystem 180 includes an illumination device 187 for emitting light from the mobile device 100. The illumination device 187 may be a flashtube, LED, fluorescent, incandescent or any other lighting device. The illumination device may be operated to adjust the lighting of an object to be captured as image data on the image capture device 185. For example, the illumination device 187 may be enabled to help illuminate a user's face when he/she is using the video 148-2 or camera 148-1 application. While the illumination device 187 is illustrated in FIG. 1 as being included in the image subsystem 180, in other example embodiments, the illumination device 187 may be part of a different or completely separate subsystem.

In some example embodiments, the mobile device 100 includes an ambient light subsystem 190 having a photosensor 195. The ambient light photosensor 195 detects incident EMR and generates and outputs an electrical signal representative of the detected EMR. Changes in the intensity or wavelength/frequency of the EMR incident on the photosensor 195 produces corresponding changes in the electrical signal output of the photosensor 195. The ambient light subsystem 190 may include one or more modules or controllers for processing EMR data received through the photosensor 195.

In some example embodiments, the ambient light subsystem 190 may be configured to detect incident light information such as the illuminance or the color temperature of EMR incident on the photosensor 195. The incident light information may include information regarding the lighting or illumination of an object that is to be captured as image data by the image capture device 185. The incident light information may also include information to be used to adjust object illumination. In some example embodiments, the ambient light subsystem 190 may be controlled or may operate in conjunction with a camera 148-1 or video application 148-2 to provide object illumination data to the processor.

Image capture device 185 is adapted for use in a camera or image capture device, and EMR photosensor 195 is adapted for detecting ambient light information such as illuminance or color temperature. Examples of possible image capture devices 185 and photosensors 195 include but are not limited to charge-coupled devices (CCD), complementary metal oxide semiconductor (CMOS) sensors, photodiodes, photoresistors or any other semiconductor device or other component capable of sensing light or image information.

In some example embodiments, one or both of the image capture device 185 and photosensor 195 include multiple photosensing elements, with different photosensing elements being adapted to sense EMR having wavelengths falling within different ranges of the electromagnetic spectrum. In some example embodiments, one or both of image capture device 185 and photosensor 195 may include separate photosensing elements adapted to capture red, green, blue and/or infrared incident EMR.

In some example embodiments, one or both of the image capture device 185 and the photosensor 195 includes multiple instances of each type of photosensing element. For example, image capture devices 185 often include arrays of pixels having red, green and blue photosensing elements.

In some example embodiments, the mobile device 100 has a proximity subsystem 170 including a proximity sensor 175 for detecting the presence of nearby objects. In mobile devices, proximity sensors 175 may provide context to the current position or use of the mobile device 100. For example, if the mobile device is a mobile phone with an active phone call connection, the proximity sensor 175 may detect when the device is brought within close proximity of a user's face thereby notifying the device that it is being used in a talk position. This may trigger the device to disable the display and the touchscreen to save power and to prevent accidental touch inputs. In another example, if the mobile device is placed inside a bag or pocket, the proximity sensor may detect the close proximity of the bag or pocket material and may disable any key inputs or may enter a power save mode.

In another example, the proximity subsystem 170 may detect the distance or proximity of the subject or object of an image captured by the image capture device 185. For example, if a user is using a video conferencing application in a low light environment, the proximity subsystem 170 may detect the distance between the user's face and the mobile device 100. The intensity of light required to illuminate the user's face may be dependent on this distance, and the video conferencing or other application may adjust a display output accordingly.

The proximity sensor 175 may be implemented with an inductive, capacitive, EMR, ultrasonic or other suitable sensor. In some example embodiments, the inductive or capacitive properties of a nearby object may cause the proximity sensor to generate electrical signals which may be interpreted by the proximity subsystem 170 or processor 102 to provide information regarding the inductance, capacitance, or distance of the nearby object.

In other example embodiments, the proximity sensor 175 includes an emitter and receiver pair wherein the receiver detects signals that have been emitted from the emitter and have reflected off a nearby object back towards the receiver. The emitter may be configured to emit sound, EMR or other signals in specific pulses, patterns, wavelengths or at different intensities. The receiver is configured to detect these signals which are interpreted by the proximity subsystem 170 or processor 102 to provide information regarding the distance or shape of a nearby object.

The proximity subsystem 170 is coupled to the processor 102 and in some example embodiments may include a monitoring circuit, a control circuit, operating software, or any combination thereof.

For the purposes of the present disclosure, object illumination data may include information regarding the current lighting conditions of an object detected by the image capture device, such as incident light information detected by one or both of the image capture device 185 and photosensor 195 as well as information that may be used to adjust the lighting of an object detected by the image capture device such as proximity information detected by the proximity sensor 175.

Upon detecting illumination of an object and generating illumination data, the processor 102 may be configured to perform any number of operations. In one example, if dim light conditions are detected, the processor 102 may be configured to adjust the illumination provided by the display screen 112 of the display device 118, or adjust the illumination device 187 or a combination of both to adjust the luminance of the display device 118 to increase the lighting of the object detected by the image capture device 185. In another example, the processor 102 may be configured to adjust the luminance of the display device 118 by adjusting the display screen 112 or the illumination device 187 or a combination of both to adjust the whitebalance or colour temperature of the image data representing an object detected by the image capture device 185.

Figure 2:
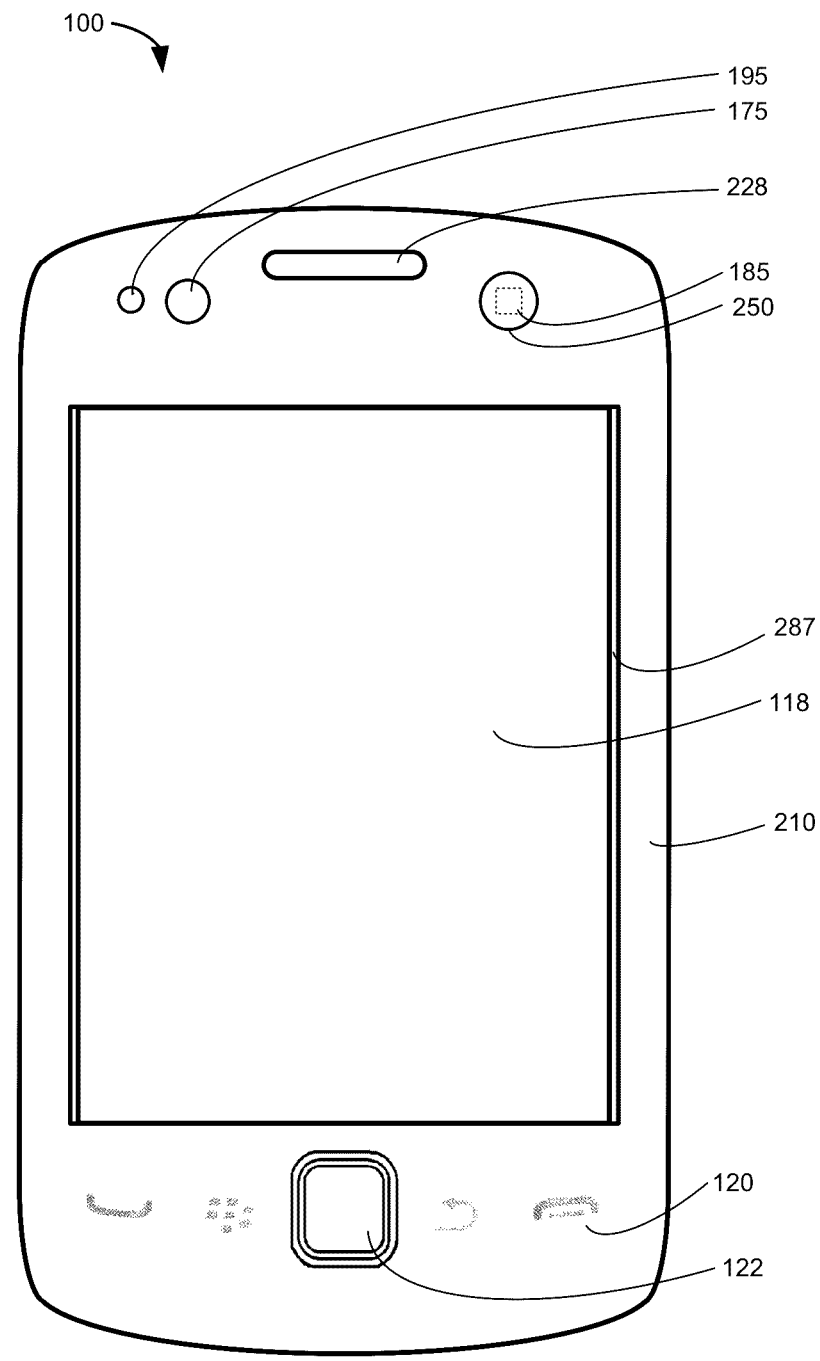
FIG. 2 is a front elevation view of an example embodiment of a mobile device.

Referring to FIG. 2, a front elevation view showing the front face of an example mobile device 100 is illustrated. The mobile device 100 includes a casing or housing 210 which forms the external structure of the mobile device 100. The housing 210 may be constructed from one or more members, and houses the internal components of the mobile device 100 such as the processor 102 and other components illustrated in FIG. 1. In some examples, the housing also has one or more openings or sockets for mounting externally accessible components such as the display screen 118, keys 120, navigation device 122, and sound port 228.

The mobile device includes an image capture device 185 positioned behind a transparent window 250 through which EMR can pass while providing a degree of protection from external objects. The transparent window 250 may be made of any light-transmissive material including but not limited to glass, plastic, or any other material suitable for use in a mobile device 100.

The image capture device 185 as illustrated in FIG. 2 is commonly referred to as a front facing camera in that the image capture device is directed outwards from the front face of the device and generally in the direction of a user viewing the display device 118 such that the image capture device 185 and the screen 112 of the display device 118 both face in a common direction. In this manner, a front facing image capture device 185 may capture an image of an object (for example a user) viewing the display device 118. With a front facing image capture device 185, the device 100 may adjust illumination of the display device to adjust the lighting of an object captured as image data by the image capture device 185. In some example embodiments, the image capture device 185 may be rotatable or otherwise moveable such that in one position, the image capture device is front facing and is directed outwards from the front face of the device, and in another position, the image capture device is back facing and is directed outwards from the rear face of the device.

In some example embodiments, the mobile device 100 may include a proximity sensor 175 and/or a photosensor 195. The proximity sensor 175 and photosensor 195 may also be positioned behind a window through which EMR can pass. In some example embodiments, the image capture device 185, the proximity sensor 175, the photosensor 195 or any combination thereof may all be positioned behind a single transparent window. The transparent window may cover the entire front face of the device or any portion of the front face of the device. While the proximity sensor 175 and the photosensor 195 are illustrated in FIG. 2 in an upper corner of the mobile device 100, they may be positioned anywhere on the device 100 suitable for detecting lighting or illumination data for an object within the field of view of the image capture device 185.

In some example embodiments, the housing 210 of the mobile device 100 includes one or more apertures 287 through which light emitted by the illumination device 187 may pass. The apertures 287 are openings or slits in the device casing. They may be covered by a light transparent material, such as a plastic, glass, or other material. In some example embodiments, the apertures 287 may be formed alongside one or more edges of display device 118. In FIG. 2, the apertures 287 are illustrated along the two side edges of the display device 118; however, in other example embodiments, the apertures 287 may be along the top and bottom edges of the display, or along any combination of the display edges.

Figure 3:
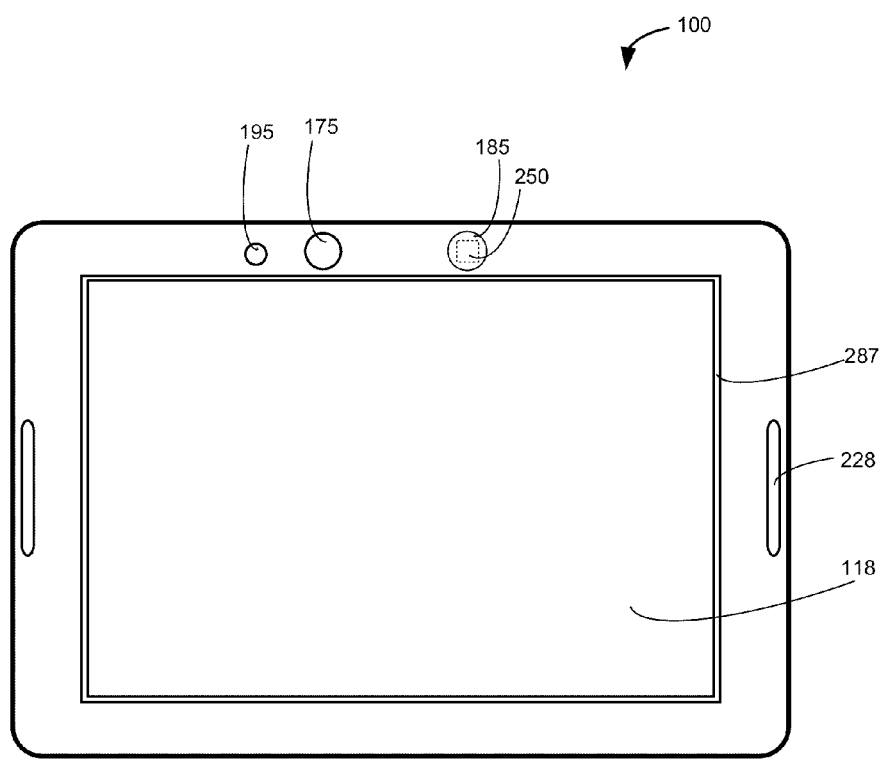
FIG. 3 is a front elevation view of an example embodiment of a mobile device having a tablet form factor.

FIG. 3 illustrates another example mobile device 100 having a tablet form factor. In this example embodiment, the aperture 287 is formed around all four edges of the display device 118. The apertures 287 in this embodiment may be continuous or nearly continuous around the display device 118. In some embodiments, the apertures 287 may be directly adjacent the display and the light transparent material covering one or more of the apertures 287 may be part of the screen overlay material that forms the display device 118. In such an embodiment, the apertures 287 may externally appear as though they are part of the display device 118 itself.

Figure 4:
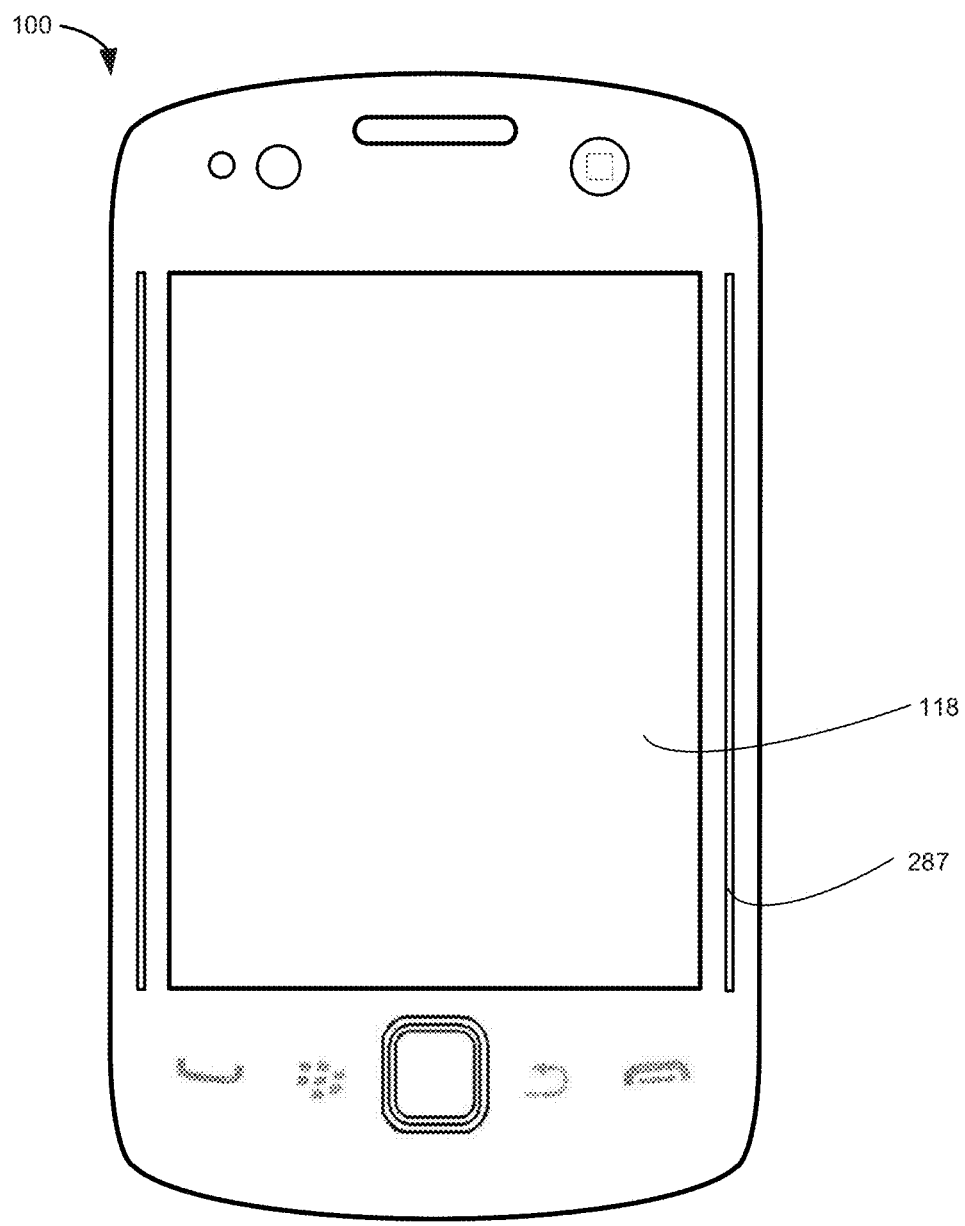
FIG. 4 is front elevation view of another example embodiment of a mobile device.

In some example embodiments, the apertures 287 may not be immediately adjacent to the display device 118 edges and may be positioned elsewhere on the front face of the housing of the device, such as in a location suitable for adjusting lighting for an image within the field of view of the image capture device 185. For example, FIG. 4 illustrates an example mobile device 100 having a slit-type aperture 287 on each side of the display device 118 forming two light bars which emit light generated by the illumination device 187. In other example embodiments, the apertures 287 may be any shape and may be positioned anywhere on the device 100.

In some example embodiments, the apertures 287 may be made of light-transmissive or reflective materials, or may be channels covered by the same light-transmissive material covering the display device 118 or other components of the device 100.

In some example embodiments, the light emitted by the illumination device 187 is channeled or directed from the illumination device 187 to the apertures 287 via one or more waveguides. The waveguides may be any shape, such as planar, strip or fiber waveguides, suitable for channeling light from the illumination device 187 to the apertures 287 or to be otherwise emitted from the device 100. The waveguides may be made of any material or combination of materials having suitable refractive properties including but not limited to polymers, glass and semiconductors.

In some example embodiments, the waveguides may diffuse or disperse the light rays emitted from the illumination device 187 such that the light being emitted from the housing 210 may be more scattered and less intense than a point light. This may reduce overexposure of an image captured by the image capture device 185 or may be more comfortable when directed towards a user's eyes.

With the waveguide to channel light, the illumination device 187 may be positioned within the housing 210 of the device 100. For example, the illumination device 187 may include one or more LEDs mounted on a printed circuit board within the housing 210. In other example embodiments, the illumination device 187 may include separate LEDs or other light sources such as fluorescent or incandescent lamps.

In other example embodiments in which the display device 118 has a backlight 112A, the illumination device 187 may be the display device 118 backlight 112A. In these embodiments, waveguides may channel a portion of the light generated by the backlight 112A to the apertures 287 such as the edges of the display device 118 as illustrated in FIGS. 2 and 3 or to other apertures 287 as illustrated in FIG. 4.

In some example embodiments, the illumination device 187 may be a second backlight separate from the display device 118 backlight. As described below, the processor 102 may be configured to display one or more lighting elements on the display device 118. In these embodiments, the illumination device 187 may provide backlighting to a portion of the lighting elements. The illumination device 187 may include larger or otherwise brighter LEDs than the LEDs in the display device 118 backlight and therefore may be capable of producing lighting elements which are brighter and provide more lighting to an object captured as image data by the image capture device 185.

In some example embodiments, the illumination device 187 may include devices capable of emitting different wavelengths of light. For example, the illumination device 187 may include different LEDs which emit different colors of light. Different colors of light may be produced by enabling single colored LEDs or different combinations of colored LEDs. In some of these example embodiments, the illumination device 187 may adjust the color of a lighting element on the display device 118 by providing a colored backlight to a portion of the lighting element.

In some example embodiments, the illumination device 187 may use waveguides or may otherwise be directed towards portions of the display device 118 used to display lighting elements. In these embodiments, the illumination device 187 brightens the light already provided by the display device 118 backlight when displaying the lighting elements. In some embodiments, multiple waveguides may be used to direct light from the illumination device to different portions of the display device 118.

For example, a first set of one or more waveguides may direct light from an illumination device 187 to a first aperture at an outer frame around the edge of the display, and a second set of one or more waveguides may direct light from an illumination device 187 to a aperture at an inner frame around the inner edge of the outer frame. In this example, the first set of waveguides may direct light to brighten an outer frame as seen in FIG. 6C, or both the first and second sets of waveguides may direct light to brighten an inner and outer frame when displaying a wider frame as seen in FIG. 6D.

In some example embodiments, the light emitted by the illumination device 187 may simultaneously provide backlighting to portions of the display screen 112, and emit light from the apertures 287.

Figure 5:
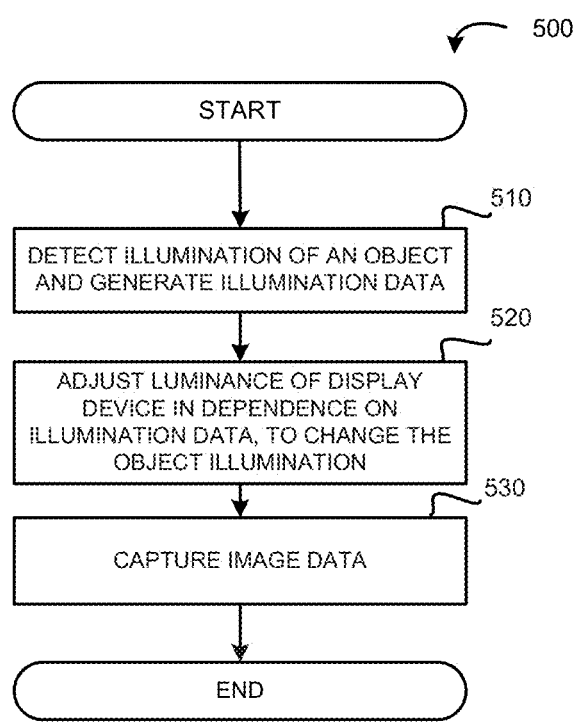
FIG. 5 shows, in flowchart form, an example method for adjusting image lighting with a mobile device having a display and an image sensor.

Referring to FIG. 5, a method 500 for adjusting object illumination is illustrated. This method 500 may be applied when the processor 102 is operating a camera or video application, or in situations when the lighting in a user's environment may benefit from adjustment by the device 100. At block 510, illumination of an object is detected at one of the sensors on the mobile device 100 and illumination data is generated. As discussed above, illumination data includes information regarding current light conditions in the mobile device's environment as well as any other information which can be used to adjust an image of an object captured by the image capture device 185.

In some example embodiments, detecting illumination of an object and generating illumination data includes detecting incident light information on the image capture device 185 and generating illumination data which includes but is not limited to luminance, color balance/temperature, or distance to a subject object. The processor 102 receives incident light information in the form of image data from the image capture device 185. In some example embodiments, the processor 102 may determine from the image data an average luminance or color balance for the image data. In other example embodiments, the processor 102 may determine a possible subject of the image data and may determine the illumination, color or distance to that subject. In some example embodiments, the image subsystem 180 includes an optical or digital zoom, or camera settings such as whitebalance, ISO speed, focal length, aperture, and exposure. In these embodiments, the illumination data detected on the image capture device may include or incorporate the zoom distance or camera settings.

In some example embodiments, detecting illumination of an object and generating illumination data includes detecting incident light information on a photosensor 195 such as luminance or color temperature. The photosensor 195 detects light incident on the photosensor 195 and in some example embodiments, from the electrical signals generated by the incident light, the ambient light subsystem 190 or the photosensor 195 itself may determine an ambient luminance or color temperature. In some example embodiments, the object illumination data detected by the ambient light subsystem may require less processing than image data from an image capture device, and therefore may be faster and may use less power.

In some example embodiments, detecting illumination of an object and generating illumination data includes detecting proximity information on a proximity sensor 175. The proximity sensor 175 may detect the presence of a nearby object or, in some example embodiments, the proximity subsystem 170 may be configured to detect the distance between the device 100 and an object which may be a subject of an image captured by the image capture device 185. Similar to the ambient light subsystem 190, the proximity subsystem 170 may utilize simpler components and algorithms than the image subsystem 180 and may therefore provide illumination data more quickly or may utilize less processing time and battery power than the image subsystem 180.

In some example embodiments, detecting 510 object illumination data may include detecting a combination of object illumination data from any combination of the sensors described herein.

At block 520, the processor is configured to adjust a luminance of the display device 118 in dependence on the illumination data detected at block 510, to change the object illumination. In some example embodiments, adjusting a luminance of the display device includes adjusting the display device 118 to emit light from the device 100 to adjust the lighting of an object detected by the image capture device 185.

For example, if at block 510, the illumination data includes detected luminance values that suggest the ambient light conditions or the object too dim, at block 520, the processor may be configured to turn on or to increase the intensity of the output of the display device 118. In some embodiments this may include one or more of the following: increasing the intensity of the backlight 112A to increase the light generally emitted from the screen 112; increasing the intensity of the light directed through light emitting apertures 187 (if present); or as explained below, temporarily dedicating portions of the display screen 112 for the purpose of emitting light to illuminate an object rather than to display an image. In some examples, the lower the detected luminance, the greater the intensity of the light outputted by the device.

In some examples, the generated illumination data includes proximity information from the proximity subsystem 170. In these examples, the processor may be configured to generate a display output based on both illumination data and proximity information. Generally, if a subject object detected by the image capture device 185 requires additional lighting and is close to the device 100, the processor may be configured to adjust the luminance of the display device to have a lower light intensity than would be generated for more distant objects. Similarly, if a subject object is a greater distance from the device 100, the processor may be configured to generate a display output having a higher intensity than if the subject was close to the device. In some examples, this may reduce overexposing subjects that are close to the device, and may reduce power consumption by lowering the intensity of the display output.

In some examples, the illumination data includes color balance or color temperature information from the image subsystem 180 or the ambient light subsystem 190. Based on this color information, the processor 102 may be configured to adjust the luminance of the display device 118 to complement or otherwise compensate for the color information. For example, if the detected object illumination data suggests that the ambient lighting has a bluish color temperature, the processor 102 may generate a display output with a stronger emphasis on red and green tones to provide fuller spectrum lighting for an image detected by the image capture device 185.

In some example embodiments, the processor is configured to adjust the illumination by the mobile device by enabling or adjusting the output of the illumination device 187 whose light is emitted from the device 100 via one or more apertures 287. The light outputted by the illumination device 187 may be different colors or intensities as discussed above, and may adjust the general lighting of an image detected by the image capture device 185, or may adjust the lighting of an image subject such as a user's face.

In some example embodiments, the processor is configured to adjust the luminance by adjusting the image data output on the display screen 112 of the display device 118. For example, in some embodiments, the processor may adjust the intensity, contrast, tint or color scheme of the screen output displayed on the display device 118 such that the light emitted by the display device 118 adjusts the light reflecting off the user's face (the object), or otherwise adjusts the lighting of an object detected by the image capture device 185.

Figure 6A:
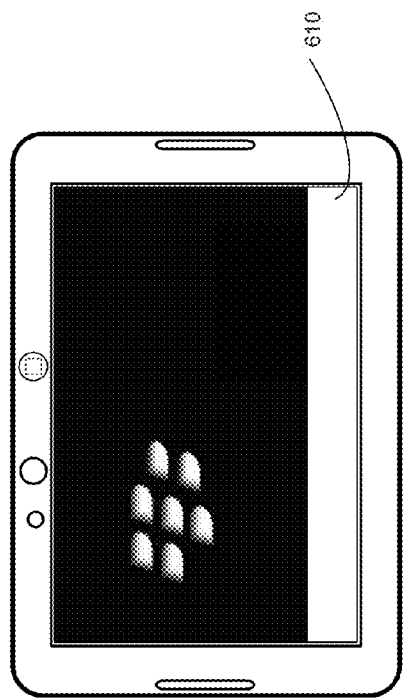
FIG. 6A is a front elevation view of an example mobile device displaying a display output with no lighting element.
Figure 6B:
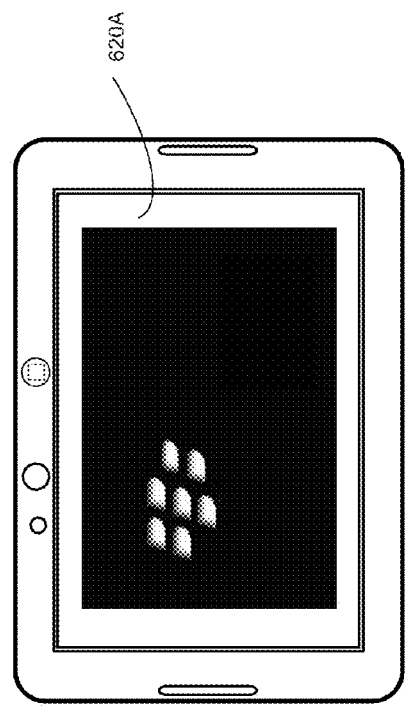
FIGS. 6B-6D are front elevations view of the example mobile device in FIG. 6A displaying display outputs with different lighting elements.
Figure 6C:
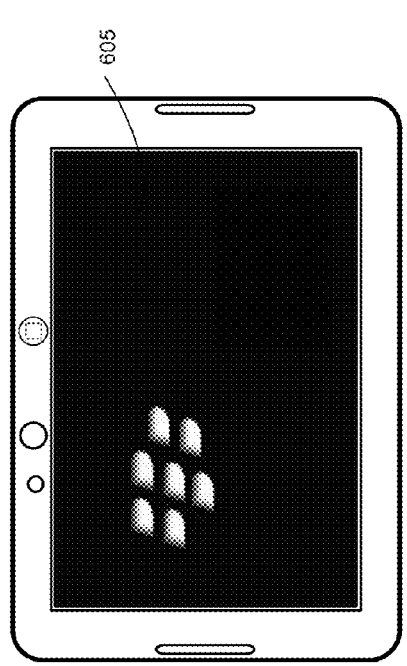
Figure 6D:
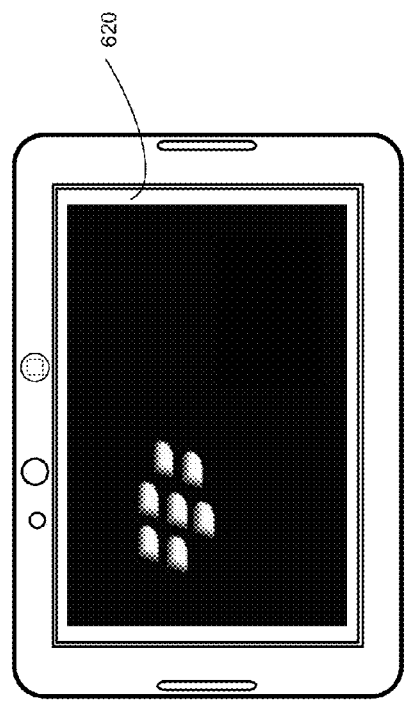

Referring to FIGS. 6A to 6D, in some example embodiments, the processor is configured to adjust luminance of the display device 118 by temporarily dedicating one or more regions of the display screen 112 to provide illumination rather than display a viewable image. In this regard, one or more lighting elements may be temporarily provided on the display screen 112 when object illumination is required for image capture. In well lit environments, the processor 102 may display a normal full-size screen output 605 on the entire display device 118 as illustrated by FIG. 6A. When the processor 102 detects object illumination suggesting that the lighting of an object to be captured as an image by the image capture device 185 may require adjusting, the processor 102 may temporarily display a dedicated lighting element in the form of a bright region such as a white strip lighting element 610 as illustrated at the bottom of the display in FIG. 6B. In some example embodiments, one or more of the size, brightness, color, orientation, shape or location of the lighting element 610 is selected by the processor based on the illumination data. For example, the lighting element could displayed as either a horizontal or vertical strip anywhere on the screen 112 of display device 118 Thus, in some example embodiments, the size, color, position, orientation, intensity or other characteristic of the lighting element may be automatically adjusted by the processor 102 based on the illumination data; however, in some example embodiments, these characteristics may be overridden or otherwise manually adjusted by the user.

In one example, if the illumination data generated in block 510 indicates that one side of a user's face is poorly lit or has an undesired color temperature, the processor may adjust luminance of the display device at block 520 in the form of a vertical strip lighting element on a side of the display screen 112 corresponding to the poorly lit side of the user's face. In another example, if the illumination data indicates that one side of a user's face is more poorly lit than the other side, the processor may adjust illumination by the display device in the form of two vertical strips, one on each side of the display screen, with each vertical strip having a different intensity to correspondingly adjust the different lighting on each side of the user's face. Selective adjustment of any other combination of lighting element positions, colors, intensities or other factors is also possible.

In some example embodiments, the lighting element may be a white or colored frame that is displayed around the perimeter of the screen 112 of display device 118 as illustrated in FIG. 6C. In some example embodiments, the size of the lighting element such as the displayed frame may be increased to increase the light adjustment. For example, if the example mobile device 100 in FIG. 6C is moved to a dimmer environment, the processor 102 may detect object illumination and generate illumination indicating a lower luminance, and in response the processor 102 may adjust the luminance by generating a display output in the form of the larger frame lighting element 620A illustrated in FIG. 6D. In some example embodiments, the processor 102 down samples, crops, or otherwise reduces the size of the image displayed as screen output 605 to provide the room temporarily required by light elements 620A.

In some example embodiments, the processor 102 may providing messages directing the movement of an object to be captured by the image capture device 185 into light provided by a lighting element or the illumination device 187. For example, the processor 102 may display text instructions, arrows, icons or other symbols on the display device 118 instructing the user to move his/her face left, right, up, down, closer or farther away from the device to improve illumination of the user's face.

In some example embodiments, the processor 102 may adjust lamination by generating a display output by emitting a burst of high intensity light from the display device 118 or the illumination device 187 similar to a flash device to briefly illuminate an image to be captured on the image capture device 185.

In some example embodiments, the processor 102 may generate a display output on the display device 118 such as a lighting element or a burst of high intensity light by increasing the output of both the display device 118 backlight and the illumination device 187. In example embodiments where the illumination device 187 may act as an additional backlight for portions of the display device 118, the illumination device 187 may allow provide higher intensity lighting elements or bursts of light.

In some example embodiments, the processor 102 may generate a display output by both displaying lighting elements on the display device 118 and emitting light from the illumination device 187 via the apertures 287.

With reference back to FIG. 5, at block 530, the processor 102 is configured to capture an image of an object with the adjusted illumination by the display device. This image is captured on the image capture device 185 in the form of image data and may be stored on the mobile device 100, displayed on the display device 118, or transmitted to another device via one of the mobile device's communication of data subsystems.

In some example embodiments, the blocks of method 500 may be repeated to provide continual adjustment to the lighting of images captured by the image capture device 185.

While the embodiments described herein are directed to particular implementations of the mobile device, it will be understood that modifications and variations may occur to those skilled in the art having read the present disclosure. All such modifications and variations are believed to be within the sphere and scope of the present disclosure.

What is claimed is:

1. A method for adjusting illumination for capturing an image of an object using a mobile device having a display device and one or more slits separate from a screen of the display device being defined in a housing of the mobile device, the method comprising:
    detecting, by the mobile device, ambient illumination of the object and generating illumination data indicating the ambient illumination of the object; and
    adjusting, by the mobile device, a sustained luminance of the mobile device by adjusting illumination emitted from the one or more slits, in response to the illumination data, wherein a waveguide diffuses light from a light source and the diffused light is emitted as illumination from the one or more slits.

2. The method of claim 1 wherein detecting the ambient illumination of the object comprises detecting incident light information from an ambient light photosensor of the mobile device.

3. The method of claim 1 wherein detecting the ambient illumination of the object comprises detecting proximity information associated with the object from a proximity sensor, the method further comprising adjusting the luminance of the mobile device by adjusting the illumination emitted from the one or more slits in dependence on the detected proximity information.

4. The method of claim 1 wherein detecting the ambient illumination of the object comprises detecting an illuminance or a color temperature of incident light.

5. The method of claim 1 further comprising providing messages on the display device, based on the illumination data, directing movement of the object into the illumination emitted by the one or more slits.

6. The method of claim 1 wherein adjusting the luminance of the mobile device comprises adjusting any one of an intensity and a tint of the illumination emitted from the one or more slits.

7. The method of claim 1 wherein the illumination emitted from the one or more slits is channeled to the one or more slits from a backlight of the display device via the waveguide.

8. The method of claim 1 wherein the mobile device comprises an image capture device and the display device and image capture device are each mounted in a common face of the mobile device and the method includes the image capture device capturing the image of the object after the luminance of the mobile device is adjusted.

9. A mobile device comprising:
    a display device having a screen;
    a housing defining one or more slits separate from the screen;
    a waveguide diffuses light from a light source and the diffused light is emitted as illumination from the one or more slits; and
    a processor configured to:
        detect ambient illumination of an object whose image is to be captured by the mobile device and generate illumination data indicating the ambient illumination of the object; and
        adjust a sustained luminance of the mobile device by adjusting illumination emitted from the one or more slits, in response to the illumination data.

10. The mobile device of claim 9 comprising an ambient light photosensor, wherein the illumination data is based on incident light information detected from the ambient light photosensor.

11. The mobile device of claim 9 comprising a proximity sensor, wherein the illumination data is based on proximity information associated with the object detected by the proximity sensor, and wherein the processor is configured to adjust the luminance of the mobile device by adjusting the illumination emitted by the one or more slits in dependence on the proximity information.

12. The mobile device of claim 9 wherein the processor is configured to display a message on the screen based on the illumination data, wherein the message contains an instruction for movement of the object into the illumination emitted by the one or more slits.

13. The mobile device of claim 9 wherein the processor is configured to adjust the luminance of the mobile device by adjusting any one of an intensity and a tint of the illumination emitted by the one or more slits.

14. The mobile device of claim 9, wherein the waveguide is further configured to channel light from a backlight for backlighting the display device to the one or more apertures.

15. The mobile device of claim 9 comprising an image capture device, wherein the display device and image capture device are each mounted in a common face of the mobile device and the processor is configured to capture the image of the object using the image capture device after the luminance of the mobile device has been adjusted.

16. The method of claim 1 wherein at least one of the one or more slits is positioned directly adjacent the screen.

17. The method of claim 1 wherein the luminance of the mobile device is continually adjusted while a real-time image of the object is displayed on the screen.

18. The method of claim 1 wherein at least one of the one or more slits is positioned spaced apart from and along an edge of the screen.

19. The mobile device of claim 9 at least one of the one or more slits is positioned directly adjacent the screen.

20. The mobile device of claim 9 wherein the processor is further configured to continually adjust the luminance of the mobile device while a real-time image of the object is displayed on the screen.

21. The mobile device of claim 9 wherein at least one of the one or more slits is positioned spaced apart from and along an edge of the screen.

* * * * *